United States Patent [19]

Suzuki et al.

[11] Patent Number: 5,087,598

[45] Date of Patent: Feb. 11, 1992

[54] METHOD FOR PRODUCTION OF PILLARED CLAY

[75] Inventors: Kenzi Suzuki, Aichi; Toshiaki Mori, Yokkaichi, both of Japan

[73] Assignees: Agency of Industrial Science; Ministry of International Trade & Industry, both of Tokyo, Japan

[21] Appl. No.: 394,969

[22] Filed: Aug. 17, 1989

[30] Foreign Application Priority Data

Aug. 22, 1988 [JP] Japan .................................. 63-207526

[51] Int. Cl.$^5$ .......................... B01J 21/16; B01J 20/12
[52] U.S. Cl. .......................................... 502/63; 502/84
[58] Field of Search .................................. 502/84, 63

[56] References Cited

U.S. PATENT DOCUMENTS 4,176,090 11/1979 Vaughan et al. ...................... 502/84
4,855,268 8/1989 Raythatha ............................. 502/84

OTHER PUBLICATIONS

Applied Clay Mineralogy, Ralph E. Grim, McGraw-Hill Book Co., Inc., New York, 1962, pp. 30–32, 54–57, 75–81 and 206–209.

*Primary Examiner*—Carl F. Dees
*Attorney, Agent, or Firm*—Oblon, Spivak, McClelland, Maier & Neustadt

[57] ABSTRACT

A pillared clay possessing a desired amount of pillers is produced by heating clay thereby changing the cation-exchange capacity owned by the clay and then adding a cation oligomer as a pillar precursor to the clay thereby causing the oligomer to exchange ion with the cation of the clay.

15 Claims, 5 Drawing Sheets

(a)  (b)

(c)  (d)

५,०८७,५९८

METHOD FOR PRODUCTION OF PILLARED CLAY

BACKGROUND OF THE INVENTION

1. Field of the Invention

This invention relates to a method for the production of pillared clay possessing a freely controlled amount of pillars. This invention, therefore, contributes to further enhancing the utility of the pillared clay as catalyst, carrier, adsorbent, or separating material.

2. Prior Art Statement

No technique has yet been established for controlling the amount of pillars in pillared clay.

Among the conventional methods for the production of pillared clay are included those which are disclosed in Japanese Patent Public Disclosure SHO 54-5884, Japanese Patent Public Disclosure SHO 54-16386, Japanese Patent Publication SHO 62-12172, and Japanese Patent Publication SHO 62-41167, for example.

The assignee of the invention of the subject patent application has won grant of U.S. Pat. Nos. 4,629,713, 4,753,908, and 4,839,318 for inventions relating to a method for the production of pillared clay.

In the patent specifications mentioned above, there are some references to the interlayer distance of the pillared clay but there is absolutely no mention of any technique for the control of the amount of pillars in the pillared clay.

The pillared clay is produced by a method which comprises mixing clay with a cationic oligomer as a precursor of pillars thereby causing the cation of the oligomer to exchange ion with the exchangeable cation of the clay.

In this method, a fixed interrelation exists between the ion-exchange capacity and the amount of pillars and an interrelation exists between the ion-exchange capacity and the cation-exchange capacity of the clay. Generally, clay possesses the cation-exchange capacity of a specific magnitude peculiar to the kind of clay to be used. Since the amount of pillars in clay is fixed by the kind of clay, the clay has not been allowed to acquire a desired amount of pillars.

In the circumstances, an earnest desire has been expressed in the industry for developing a method capable of producing pillared clay possessing a desired amount of pillars.

SUMMARY OF THE INVENTION

The inventors have continued a study in search of a method capable of attaining the above desire and, consequently, have accomplished the present invention.

To be specific, this invention is directed to a method for the production of pillared clay possessing a desired amount of pillars, which method essentially consists of heating clay, thereby changing the cation-exchange capacity owned by the clay and then adding a cationic oligomer as a precursor for pillars to the clay, thereby allowing the cation of the oligomer to the exchange ion with the cation of the clay.

The above and other objects and features of the invention will become more apparent from the following detailed description with reference to the accompanying drawings.

DETAILED DESCRIPTION OF THE PREFERRED EMBODIMENT

Figure 1:
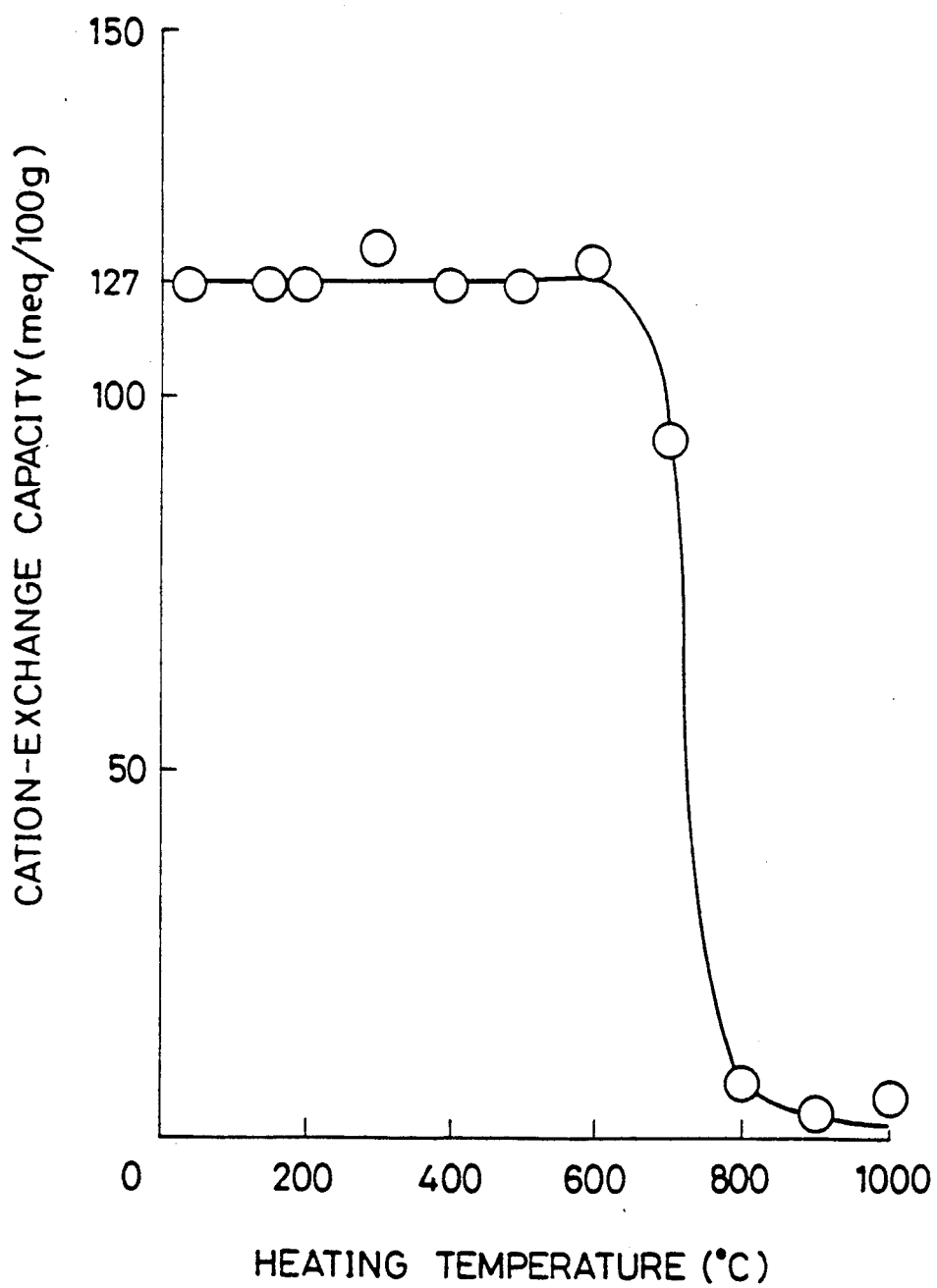
FIG. 1 is a diagram showing the relation between the cation-exchange capacity owned by Na-montmorillonite and the heating temperature.

The clay to be used as raw material for this invention is a smectite compound represented by montmorillonite. It should be noted, however, that this is not the only clay available for this invention and that any clay possessing the nature to be described herein below may be used for this invention. Montmorillonite has silicate tetrahedrons—alumina octahedrons—silicate tetrahedrons superimposed as covalently bonded through the medium of oxygen atoms to form one crystalline layer. This crystalline layer will be referred to hereinafter as a silicate layer. Part of the aluminum of the central metal of the alumina octahedrons in the silicate layer has magnesium substituted for it, magnesium having a smaller positive charge than aluminum. Further, part of the silicon of the silicate tetrahedrons has aluminum having a smaller positive charge than silicon substituted for it. Owing to this substitution, the silicate layer is deprived of charge balance and consequently assumes negative charge. In conformity to the magnitude of this negative charge, cations (such as, for example, $Na^+$, $Ca^{2+}$, $Ni^{2+}$, and $Al^{3+}$) are distributed between the silicate layer in such a manner as to retain the overall charge balance. When the cations present between the silicate layers are $Na^+$, the clay is called a Na-montmorillonite. When the cations are $Ca^{2+}$, the clay is called a Ca-montmorillonite. The cations such as $Na^+$, $Ca^{2+}$, $Ni^{2+}$, or $Al^{3+}$ which occur between the layers are capable of partly exchanging themselves for other cations. The amount of such cations capable of exchange is called a cation exchange capacity, the magnitude of which is approximately 130 meq/100 g. The cation-exchange capacity is a physical constant peculiar to the relevant species of montmorillonite. The idea of freely changing this cation-exchange capacity has never been conceived to date. After a diligent study, the inventors have found that the amount of exchangeable cations of montmorillonite can be changed by simply heating the montmorillonite. This phenomenon as observed in Na-montmorillonite will be described below with reference to FIG. 1. FIG. 1 shows the relation between the cation-exchange capacity exhibited by Na-montmorillonite after being heated in an electric furnace in an atmosphere of air and the heating temperature. The cation-exchange capacity remains intact at 127 meq/100 g when the heating temperature is up to 600° C. It, however, begins to decrease as the heating temperature exceeds 600° C. and dwindles to 0 meq/100 g as the heating temperature reaches 800° C. From the results of this test, it is clearly noted that the cation-exchange capacity of montmorillonite can be controlled by regulating the heating temperature between 600° and 800° C. Then, the relation between the heating temperature and the cation-exchange capacity observed in Ni-montmorillonite will be described below with reference to FIG. 2. The results of the test in the case of Ni-montmorillonite show that the cation-exchange capacity decrease in proportion as the heating temperature increases. This fact indicates that the cation-exchange capacity can be controlled in a wide range of heating temperature. The method for controlling the cation-exchange capacity of clay therefore resides in controlling the heating temperature. By this method, the cation-exchange capacity of montmorillonite can be controlled from 0 meq/100 g to the magnitude initially possessed by montmorillonite. Specifically in this case, control can be attained in the range of 0 to 127 meq/100 g.

Figure 2:
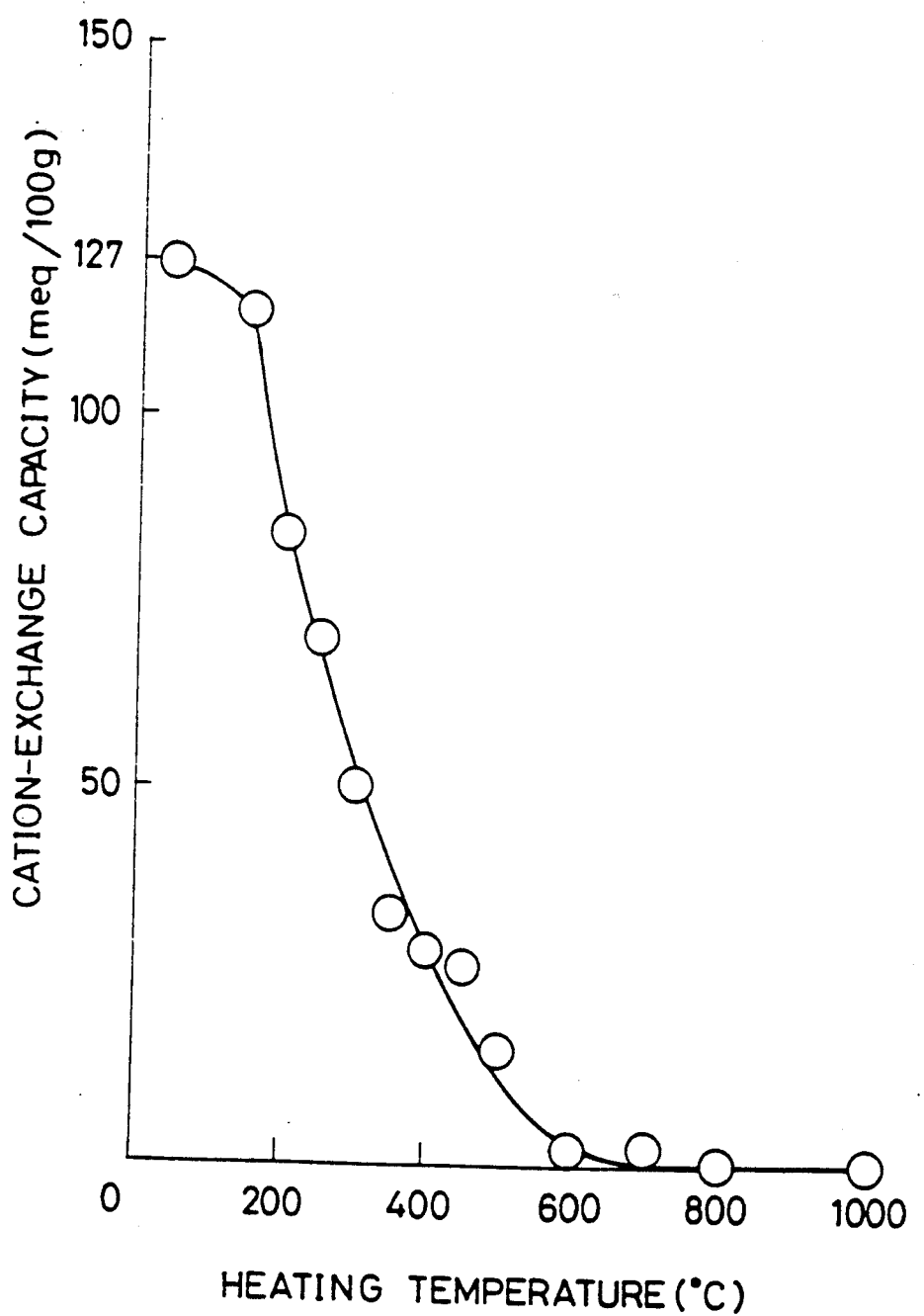
FIG. 2 is a diagram showing the relation between the cation-exchange capacity owned by Ni-montmorillonite and the heating temperature.
Figure 3:
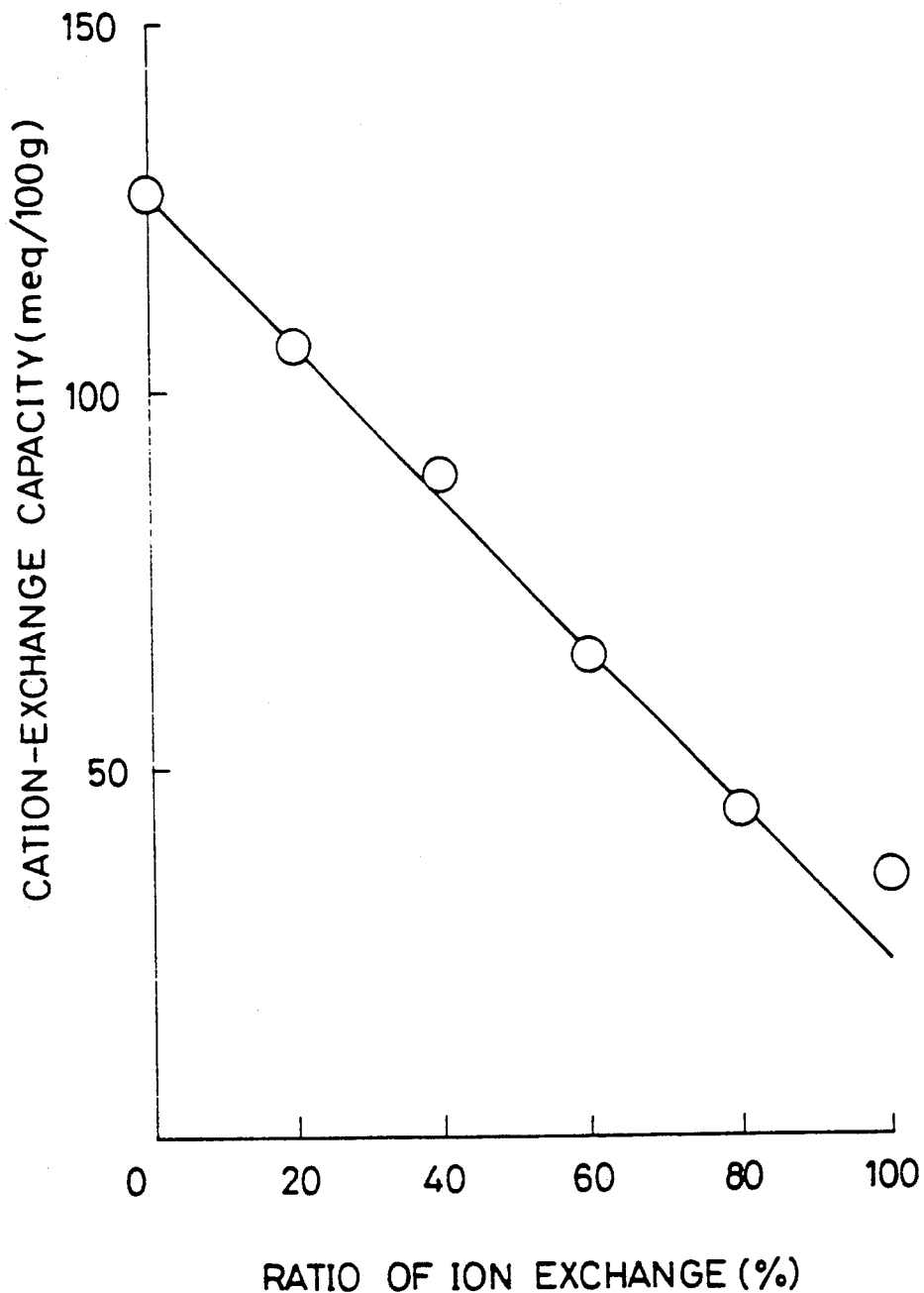
FIG. 3 is a diagram showing the relation between the cation-exchange capacity and the ratio of ion exchange exhibited by Ni/Na-montmorillonite after heating at 400° C.

Concerning the relation between the heating temperature and the cation-exchange capacity, the following conclusion can be drawn from the data of FIG. 1 and FIG. 2. The effect of the heating temperature upon the cation-exchange capacity of montmorillonite varies with the kind of cations which are present between the layers. For example, the cation-exchange capacity after heating at 400° C. is 127 meq/100 g in the case of Na-montmorillonite and 25 meq/100 g in the case of Ni-montmorillonite. From these experimental data, it may be safely inferred that when Ni/Na-montmorillonite prepared by having part of Na$^+$ of Na-montmorillonite substituted for by Ni$^{2+}$ is heated to 400° C., of the Na$^+$ and Ni$^{2+}$ which are present between the layers, Na$^+$ continues to possess the exchange capacity, but Ni$^{2+}$ loses the exchange capacity. This phenomenon will be described below with reference to FIG. 3. Ni/Na-montmorillonite compounds possessing ion-exchange ratios of 0, 20, 40, 60, 80, and 100% are prepared by subjecting the Na-montmorillonite possessing an initial cation-exchange capacity of 127 meq/100 g to ion exchange with Ni$^{2+}$ and are heated at 400° C. In the case of the product having an ion exchange ratio of 40%, for example, of the initial cation-exchange capacity of 127 meq/100 g owned by the Na-montmorillonite as raw material, 51 meq/100 g, namely, 40% of the initial capacity, is accounted for by Ni$^{2+}$ and 76 meq/100 g, namely, 60% of the initial capacity, by Na$^+$ respectively. The compounds of the ion exchange ratios of 0% and 100% are respectively Na- and Ni-montmorillonite. As clearly noted from the results shown in FIG. 3, the relation between the ion exchange ratio and the cation-exchange capacity is linear. This fact is very convenient from the standpoint of controlling the cation-exchange capacity. The method for controlling the cation-exchange capacity of clay, therefore, resides in subjecting part of the interlayer ion to ion exchange with other cation, thereby allowing a plurality of cations to occur between the layers and then heating the clay to a suitable temperature. In this case, the heating temperature may be suitably decided, depending on the kind of cations to be involved, so as to obtain a desired cation-exchange capacity. The heating made at a temperature exceeding 800° C. is meaningless because the montmorillonite is completely deprived of its cation-exchange capacity beyond this temperature. This means that the heating temperature must be not higher than 800° C. By this method, the cation-exchange capacity of montmorillonite can be controlled from the magnitude initially owned by montmorillonite to 0 meq/100 g.

The fact that montmorillonite is enabled by heating to decrease its cation-exchange capacity has been described. This phenomenon originates in the fact that the interlayer ion is deprived of its exchange capacity by heating. This phenomenon is referred to as fixation. Now, the fixation as observed in montmorillonite will be described below. On the surface of the silicate layer of montmorillonite, the oxygen atoms forming silica tetrahedrons are arranged in such a manner as to form hexagonal meshes. These hexagonal meshes contain holes 1.4 Angstroms in radius. When the clay is heated, the cations which are present between the layers are caused to permeate into the silicate layer and are fixed. The cations which are allowed to be present in the clay of this invention, therefore, are those of H, Na, Mg, Al, K, Ca, Ti, V, Cr, Mn, Fe, Co, Ni, Zn, Sr, Y, Zr, Mo, Ru, Rh, Pd, Ag, Sn, Ba, rare earth elements, Hf, Ta, W, and Pt, for example, which measure not more than 1.4 Angstroms in radius. Among the cations mentioned above, Na$^+$, Al$^{3+}$, Ni$^{2+}$, and Ca$^{2+}$ prove to be particularly practical. In consequence of this fixation, the cations formerly present between the layers decrease and the amount of negative charge in the silicate layers is decreased by the amount of charge of the cations so fixed (F. B. Bear, Chemistry of the Soil, p. 385 to p 386 (1964), Reinhold Publishing Corp., U.S.A.). This invention utilizes this phenomenon of fixation for the production of a pillared clay possessing a desired amount of pillars.

The pillared clay is produced by the conventional method. Now, one example of the production will be cited below. In a stirrer, 500 ml of distilled water and 3 g of montmorillonite were thoroughly stirred to prepare a slurry. It is desired that the slurry concentration be suitable for stirring. Specifically, it is desired that it be not more than 10 wt %. Of course, it may exceed this level when necessary. The slurry thus obtained is kept vigorously stirred and 40 ml of an aqueous 10 wt % aluminum chlorohydroxide solution (having a hydroxy-Al oligomer formed therein) is added thereto piecemeal. After the addition, the resultant mixture is left standing at normal room temperature for one day. It is desired that the amount of aluminum chlorohydroxide added be enough for permitting complete exchange of the exchangeable ions owned by montmorillonite. The product is filtered, then optionally washed several times with 1 liter of distilled water, and subsequently dried. The product obtained by this method is a pillared clay possessing aluminum hydroxide pillars. When this pillared clay is heated in an electric oven, the aluminum hydroxide pillars are converted into aluminum oxide pillars. Depending on the purpose for which the produced pillared clay is used, the heating treatment may be omitted from the procedure described above. The inventors' idea of using montmorillonite compounds of different cation-exchange capacities in combination during the synthesis of a pillared clay has led to successful production of a pillared clay possessing a desired amount of pillars for the first time in the art. In this case, the amount of pillars is in the range of 0 to 0.25 g as alumina per g of montmorillonite.

Conventionally, the amount of pillars in a pillar clay produced from a given clay has been fixed at a specific magnitude which is determined by the cation-exchange capacity of the clay used as the raw material. In accordance with this invention, the pillared clay possessing a desired amount of pillars can be easily obtained by changing the cation-exchange capacity of a given clay by heating and, when the clay has a chemical composition of montmorillonite, further causing a plurality of cations to occur between the silicate layers, thereby conferring upon the clay a cation-exchange capacity corresponding to the pillars desired to be formed.

Figure 4:
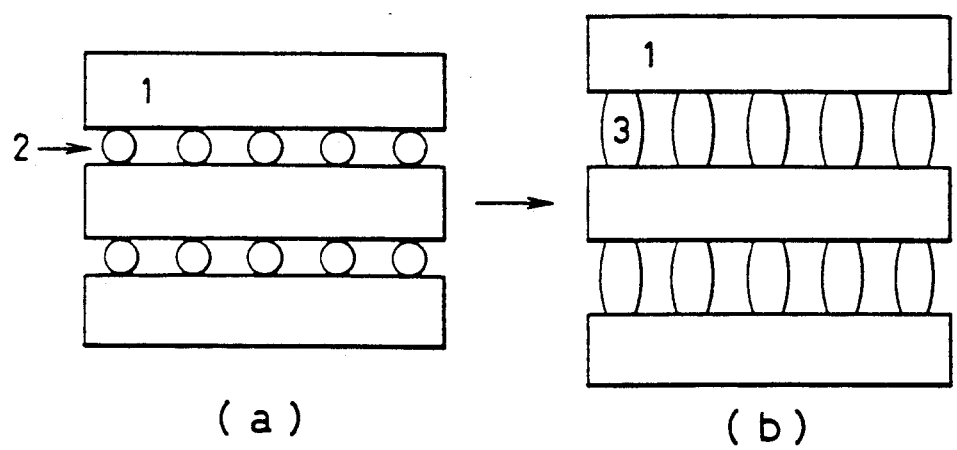
FIG. 4 is a diagram showing the relation between the cation-exchange capacity and the amount of pillars in pillared clay.
Figure 4:
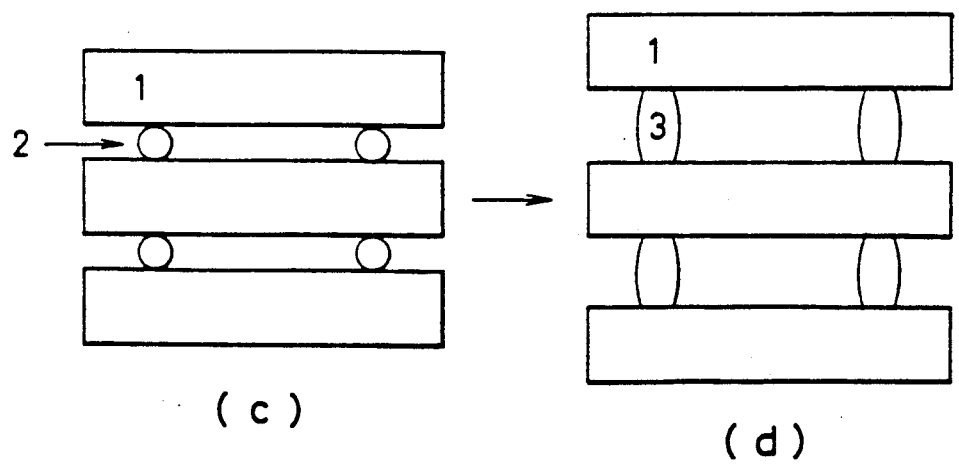

Now, the relation between the cation-exchange capacity and the amount of pillars in the clay will be described below with reference to FIG. 4. During the synthesis of the pillared clay, the initial reaction induces incorporation of a cationic oligomer, namely a precursor for pillars, between the silicate layers through ion exchange with the interlayer ions. The amount of the cationic oligomer to be so incorporated is determined by the ion-exchange, namely, the amount of the cation-exchange capacity possessed by the clay.

In the diagram, 1 stands for a silicate layer, 2 for an exchangeable cation, and 3 for a pillar formed in consequence of ion exchange with the exchangeable cation. The parts (a) and (c) of the diagram depict clays as raw material and the parts (b) and (d) pillared clays produced consequently. As illustrated, the pillared clay (b) produced from the clay (a) possessing a large cation-exchange capacity has a large amount of pillars, whereas the pillared clay (d) produced from the clay (c) possessing a small cation-exchange capacity has a small amount of pillars. Since this invention permits production of clay possessing a desired cation-exchange capacity, it is capable of easily producing a pillared clay possessing a desired amount of pillars.

A pillared clay possessing two-dimensional pores can be expected to exhibit the same function as zeolite. The feasibility of the pillared clay of this structure has been studied in various fields to date. This invention concerns a method for controlling the amount of pillars, which constitutes in itself an important factor for the two-dimensional structure. This method brings about improvement of the function of the pillared clay and manifestation of a new function.

Now, the present invention will be described in detail below with reference to referential examples and working examples.

REFERENTIAL EXAMPLE 1

(Conventional method for production of pillars from montmorillonite without change in cation-exchange capacity)

In 500 ml of distilled water, 3.0 g of montmorillonite having a cation-exchange capacity of 127 meq/100 g was thoroughly stirred. The resultant slurry was kept stirred and 50 ml of an aqueous 8 wt % aluminum chlorohydroxide solution was added piecemeal. After the addition, the resultant mixture was left standing at rest for one day. The aqueous aluminum chlorohydroxide solution gave rise to hydroxy-Al oligomer. The resultant mixture was filtered. The product consequently obtained was dried in an oven at 60° C. for three days, pulverized, and then heated in an electric furnace in an atmosphere of air at 500° C. for one hour. The pillared clay thus produced was characterized by fluorescent X-ray analysis, X-ray diffraction analysis, and nitrogen adsorption-desorption method. The results were as shown below. The amount of pillars ($Al_2O_3$) was 0.247 g/g of clay, the interlayer distance was 7.9 Å, and the specific surface area was 207 $m^2$/g.

EXAMPLE 1

In 500 ml of distilled water, 5.0 g of Na-montmorillonite as raw material having a cation-exchange capacity of 127 meq/100 g was stirred. The resultant slurry was kept stirred and 8.6 ml of an aqueous 0.192N $NiCl_2$ solution was added thereto. The resultant mixture was left standing at rest at normal room temperature for four days. Consequently, $Ni^{2+}$ was substituted for part of $Na^+$. Then, the mixture was centrifuged to recover clay. The clay was freeze dried and heated in an electric furnace in an atmosphere of air at 400° C. for one hour. The montmorillonite thus obtained exhibited a cation-exchange capacity of 115 meq/100 g. A pillared clay was synthesized by the procedure of Referential Example 1 from the montmorillonite having a cation-exchange capacity of 115 meq/100 g. The results of characterization of this pillared clay were as follows: the amount of pillars ($Al_2O_3$) was 0.224 g/g of clay, the interlayer distance was 7.7 Å, and the specific surface area was 207 $m^2$/g.

EXAMPLE 2

In 500 ml of distilled water, 5.0 g of Na-montmorillonite as a raw material possessing a cation-exchange capacity of 127 meq/100 g was stirred. The resultant slurry was kept stirred and 7.2 ml of an aqueous 0.192N $NiCl_2$ solution was added and left standing at rest at normal room temperature for four days. Consequently, $Ni^{2+}$ was substituted for part of $Na^+$. The resultant mixture was centrifuged to recover clay. This clay was freeze dried and heated in an electric furnace in an atmosphere of air at 400° C. for one hours. The montmorillonite thus obtained exhibited a cation-exchange capacity of 103 meq/100 g.

A pillared clay was synthesized by the procedure of Referential Example 1 from the montmorillonite possessing a cation-exchange capacity of 103 meq/100 g. The results of characterization of this pillared clay were as follows: the amount of pillars ($Al_2O_3$) was 0.201 g/g of clay, the interlayer distance was 8.4 Å, and the specific surface area was 267 $m^2$/g.

EXAMPLE 3

In 500 ml of distilled water, 5.0 g of Na-montmorillonite as a raw material possessing a cation-exchange capacity of 127 meq/100 g was stirred. The resultant slurry was kept stirred and 14.5 ml of an aqueous 0.192N $NiCl_2$ solution was added. The resultant mixture was left standing at rest at normal room temperature for four days. Consequently, $Ni^{2+}$ was substituted for part of $Na^+$. Then, the mixture was centrifuged to recover clay. The clay was freeze dried and heated in an electric furnace in an atmosphere of air at 400° C. for one hour. The montmorillonite thus obtained exhibited a cation-exchange capacity of 78.6 meq/100 g.

A pillared clay was synthesized by the procedure of Referential Example 1 from the montmorillonite possessing a cation-exchange capacity of 78.6 meq/100 g. The results of characterization of this pillared clay were as follows: the amount of pillars ($Al_2O_3$) was 0.158 g/g of clay, the interlayer distance was 7.3 Å, and the specific surface area was 261 $m^2$/g.

EXAMPLE 4

In 500 ml of distilled water, 5.0 g of Na-montmorillonite as a raw material possessing a cation-exchange capacity of 127 meq/100 g as a raw material was stirred.

The resultant slurry was kept stirred and 5.6 ml of an aqueous 1.0N NiCl$_2$ solution was added. The resultant mixture was left standing at rest at normal room temperature for four days. Consequently, Ni$^{2+}$ was substituted for part of Na$^+$. Then, the mixture was centrifuged to recover clay. The clay was freeze dried and heated in an electric furnace in an atmosphere of air at 400° C. for one hour. The montmorillonite thus obtained exhibited a cation-exchange capacity of 30.3 meq/100 g.

A pillared clay was synthesized by the procedure of Referential Example 1 from the montmorillonite possessing a cation-exchange capacity of 30.3 meq/100 g. The results of characterization of this pillared clay were as follows: the amount of pillars (Al$_2$O$_3$) was 0.022 g/g of clay, the interlayer distance was 0.0 Å, and the specific surface area was 94 m$^2$/g.

REFERENTIAL EXAMPLE 2:

(Example in which the cation-exchange capacity of clay was decreased to 0 meq/100 g in consequence of heating)

In an electric furnace kept in an atmosphere of air, 3.0 g of Ni-montmorillonite possessing a cation-exchange capacity of 130 meq/100 g was heated at 700° C. for one hour. After the heating, the montmorillonite was found to possess a cation-exchange capacity of 0 meq/100 g.

A pillared clay was synthesized by the procedure of Referential Example 1 from the montmorillonite possessing 0 meq/100 g. The results of characterization of this pillared clay were as follows: the amount of pillars (Al$_2$O$_3$) was 0.0 g/g of clay, the interlayer distance was 0.0 Å, and the specific surface area was 30 m$^2$/g.

Figure 5:
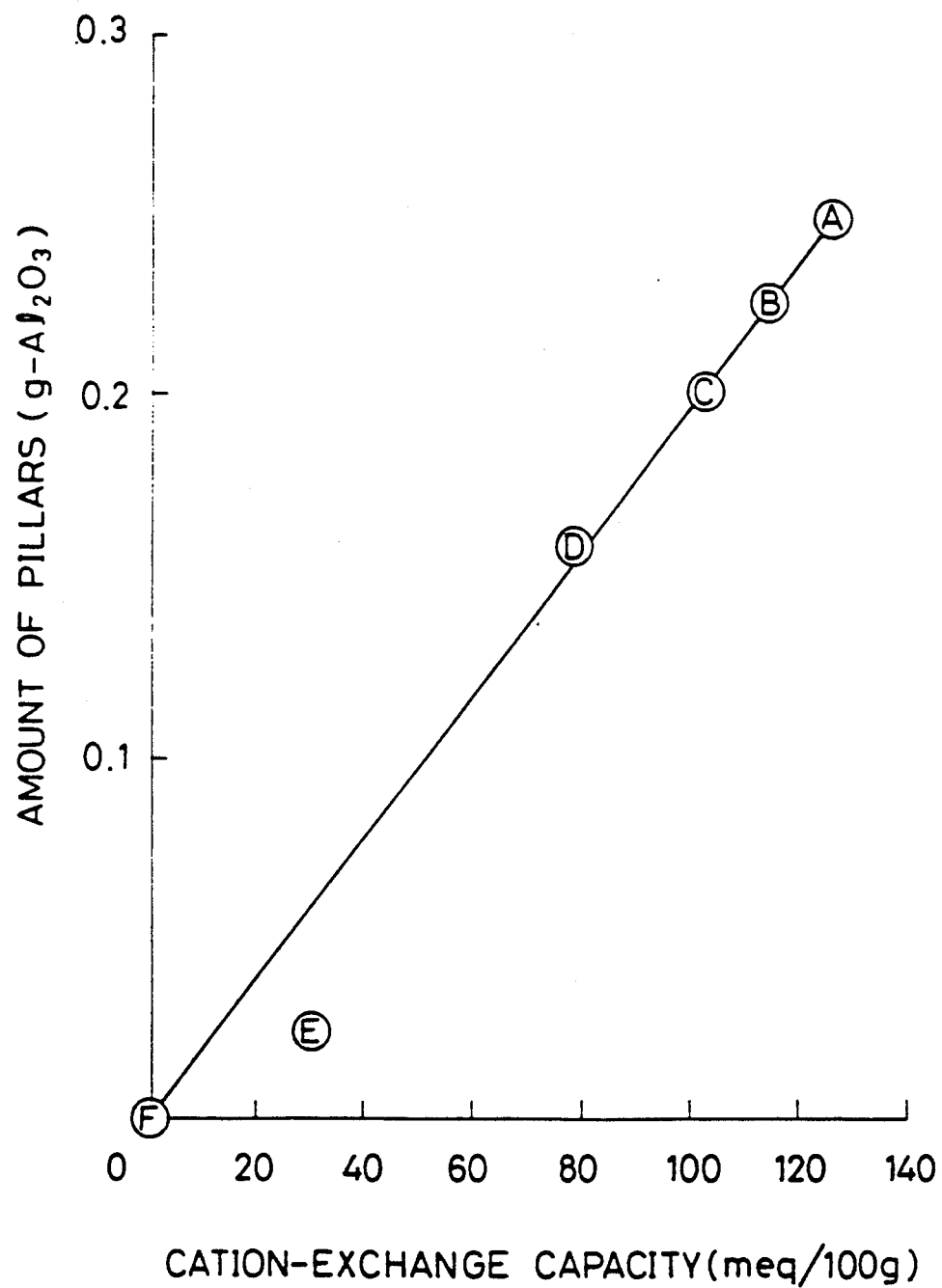
FIG. 5 is a diagram showing the relation between the cation-exchange capacity and the amount of pillars of a varying clay as raw material used in Referential Examples 1 and 2 and Examples 1 to 4.

The results of cation-exchange capacity and amount of pillars obtained in Examples 1 to 4 and Referential Examples 1 and 2 are summarized diagrammatically in FIG. 5.

In FIG. 5, (A), (B), (C), (D), (E), and (F) represent the data of Referential Example 1, Examples 1, 2, 3 and 4, and Referential Example 2 respectively.

The results of FIG. 5 indicate that the cation-exchange capacity and the amount of pillars are directly proportional to each other.

What is claimed is:

1. A method for the production of a pillared clay containing a desired amount of pillars, comprising the steps of:

heating a given clay structured of silicate layers and containing at least one cation species having a radius of not more than 1.4 Å to a temperature sufficient to cause fixation of a reduced amount of the original amount of cations in the clay between said silicate layers, thereby changing the cation exchange capacity possessed by said clay; and treating said clay with a cationic oligomer, as a pillar precursor, thereby inducing ion exchange between the cations of the clay and the cations of said precursor.

2. The method according to claim 1, wherein said clay is a smectite compound.

3. The method according to claim 1, wherein said cationic oligomer is at least one member selected from the group consisting of hydroxy-Al-oligomer, hydroxy-Zr-oligomer, and hydroxy-Cr-oligomer.

4. The method according to claim 3, wherein said cationic oligomer is a hydroxy-Al-oligomer and said pillars are formed of aluminum hydroxide.

5. A method according to claim 2, wherein said smectite compound is montmorillonite.

6. A method according to claim 5, wherein the number of species of cations present between silicate layers of montmorillonite is at least one.

7. A method according to claim 6, wherein said cation is Na$^+$.

8. A method according to claim 6, wherein said cation is Ni$^{2+}$.

9. A method according to claim 6, wherein said cation is Ca$^{2+}$.

10. A method according to claim 6, wherein said cation is Al$^{3+}$.

11. A method according to claim 6, wherein other cations are substituted for part of said cation.

12. The method according to claim 1, further the step of heating said clay treated with said cationic oligomer.

13. The method according to claim 1, wherein the cations of said clay are a member selected from the group consisting of H, Na, Mg, Al, K, Ca, Ti, V, Cr, Mn, Fe, Co, Ni, Zn, Sr, Y, Zr, Mo, Ru, Rh, Pd, Ag, Sn, Ba, rare earth elements, Hf, Ta, W, and Pt.

14. The method according to claim 13 wherein said cations are selected from the group consisting of Na, Al, Ni and Ca.

15. The method according to claim 1, wherein said pillared clay is montmorillonite pillared with up to 0.25 g of alumina per gram of montmorillonite clay.

* * * * *